Aug. 23, 1938.    L. GANDRIAUT    2,127,861
TOOL FOR CUTTING UP INTO SLICES PRODUCTS HAVING SOFT AND HARD PARTS
Filed July 26, 1935    2 Sheets-Sheet 1
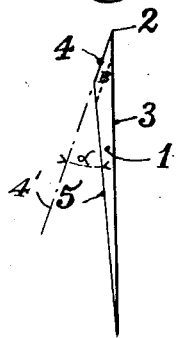
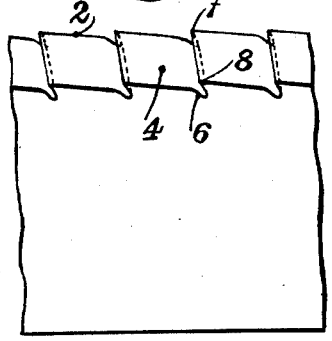
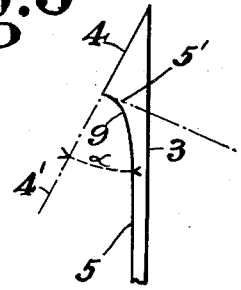
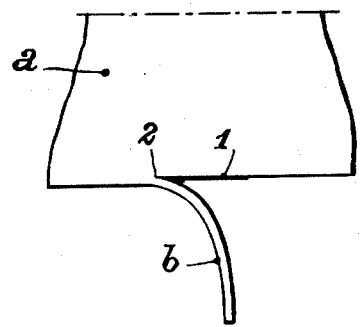
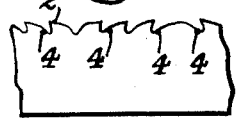
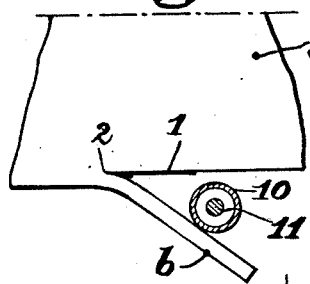
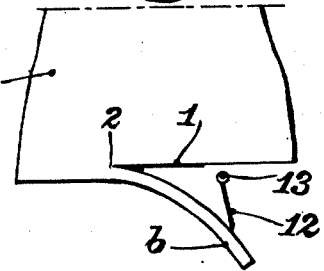
LUCIEN GANDRIAUT
INVENTOR
By William C. Linton
ATTORNEY Aug. 23, 1938.  L. GANDRIAUT  2,127,861
TOOL FOR CUTTING UP INTO SLICES PRODUCTS HAVING SOFT AND HARD PARTS
Filed July 26, 1935  2 Sheets-Sheet 2
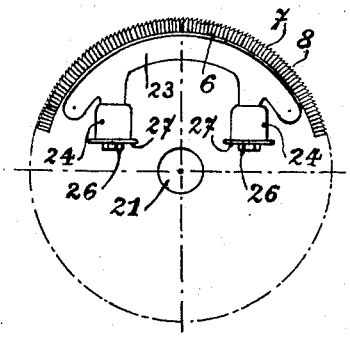
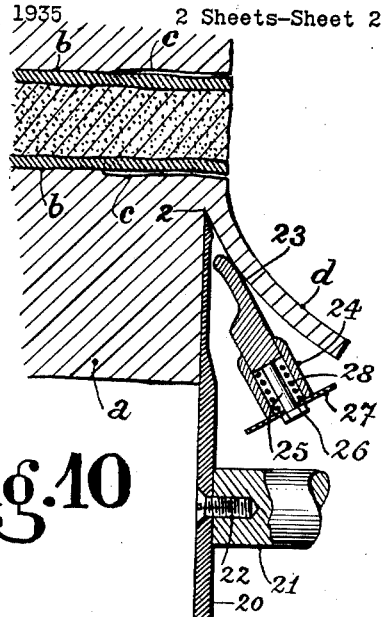
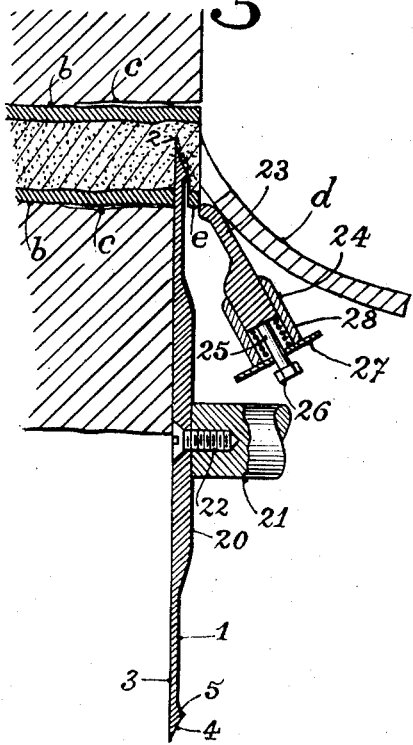
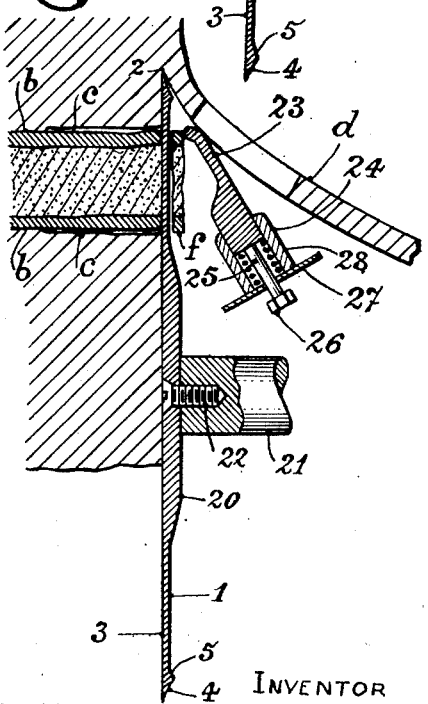
INVENTOR
LUCIEN GANDRIAUT
By William B. Linton
ATTORNEY Patented Aug. 23, 1938

2,127,861

UNITED STATES PATENT OFFICE 2,127,861

TOOL FOR CUTTING UP INTO SLICES PRODUCTS HAVING SOFT AND HARD PARTS

Lucien Gandriaut, Lyon, France

Application July 26, 1935, Serial No. 33,420
In France July 30, 1934

2 Claims. (Cl. 146—102)

The present invention has for its object a tool permitting the cutting into slices of products, such as meats, which have tender parts (the flesh) and hard parts (the bones).

This tool comprises a blade having a cutting edge adjacent to a smooth face and another face having a marginal toothed portion for sawing the hard parts of said product, and the edge of the said marginal toothed portion opposite to the said cutting edge being adjacent to a part which makes, with the virtual prolongation of the said toothed face, an angle greater than the angle of the said toothed portion with the smooth face, the said part being thus adapted for clearing away the fragments of hard matter resulting from the sawing of said toothed portion.

According to the present invention, a tool of the type described above is arranged with the toothed side of the blade adjacent to the cut part of the product and provided with a deflector carried in a setting which is fixed relatively to the cutting blade, this deflector being situated at the rear of the toothed side of the cutting blade, so as automatically to remove the cut part of the product away from the remaining mass of same. The deflector may be formed by:—

(a) A roller, (b) Or by a scraper for removing the fragments of matter adhering to the cut part, this scraper being adjustable.

The cutting tool is, also in accordance with the present invention, provided with members which permit a continuous movement to be imparted to it. For this purpose, this cutting tool is constructed so as to have the form of a circular blade, provided with a rotary driving spindle. In this manner, it is possible to construct the cutting tool with a reinforced centre part, which gives it a notable resistance against the tendency to deformation due to the lateral working of the toothing.

Likewise in accordance with the present invention, the deflector employed in conjunction with this tool may be mounted, for preference, in a slide which is arranged in a transverse manner relatively to the sides of the cutting blade and which is combined with elastic members in such a manner that this deflector can be pushed back when it happens to come up against a hard part, bone or the like, of the piece in process of being cut, and move out of the way of this hard part, so as to be able afterwards to glide over it.

Likewise in accordance with the present invention and with a view to facilitating the cutting of slices simultaneously in the tender parts and in the hard parts of the material thus cut into slices, the tender parts of the material adhering to the hard parts, parts such as flesh adhering to a bone, are, previously to the cutting into slices, detached from these hard parts, for example by passing a knife of suitable shape between the hard part and the soft part, i. e., in the case of pieces of meat, between the bone and the meat next to it.

The accompanying diagrammatic drawings, which are intended to show examples of embodiment of the invention and in no way to limit its scope, illustrate:—

Fig. 1, an end view of a cutting tool constructed in accordance with the principles mentioned above.

Fig. 2, a front view of the same tool.

Fig. 3, an end view of another shape of the tool shown in Fig. 1.

Figs. 4 and 5, in front view, two other shapes of the tool shown in Fig. 1.

Fig. 6, the tool in action.

Fig. 7, the method of working of a tool with roller deflector.

Fig. 8, the method of working of a tool with scraper deflector.

Fig. 9, in front view, a part of a cutting tool constructed in circular form and the deflector combined with same.

Fig. 10, this circular tool in the course of working and at the beginning of an operation for the cutting of a piece of meat, for example, a ham on bone.

Fig. 11, a view similar to Fig. 10, this view being taken when the cutting tool is exerting its action on the bone.

Fig. 12, a view similar to Fig. 11, this view showing the position of the members at the very instant when the cutting of the bone has been accomplished.

In these various figures the same reference characters denote the same parts.

Figs. 1 and 2, the tool shown at 1 has a blade in which the cutting edge 2 is adjacent to a smooth side 3 for cutting the tender parts of the product to be cut and to a toothed side 4 for the planing or the sawing of the hard parts of this same product, this toothed side being in its turn adjacent to part 5' of a side 5; the said part 5' makes with the virtual prolongation 4' of the toothed face 4 an angle $\alpha$ which is greater than the angle $\beta$ made by the said toothed face 4 with the smoothed face 3, the said part 5' being thus adapted for clearing away the fragments of hard matter produced by this planing or sawing.

The smooth side 3 is shown here as flat, but it could likewise be curved.

On the toothed side 4, the teeth are backed off at 6; the edge 7, 8 of each tooth effects the operation of planing the hard parts. This edge is preferably free and backed off to the bottom of each tooth.

The face 5, which is set back relatively to the face 4, facilitates the removal of the fragments resulting from the planing, and thus permits the passage of the blade in the hard parts without any jamming.

The tool is actuated, manually or mechanically, with either a continuous movement or with an intermittent movement.

Fig. 3, the tool shown has a profile similar to that of Fig. 1, its clearing side 5 being, in this case, parallel to the side 3 and joined to the toothed side 4 by the part 5' which, here, makes a heel 9.

Fig. 4, the cutting edge 2 is formed by teeth 4, which are all arranged in the same direction.

Fig. 5, these teeth 4 are arranged in two opposite directions.

Fig. 6, the tool 1 is in the process of cutting the lower part of a piece of meat a; the cut slice b comes away, owing to its own weight, from the part a, which thus facilitates the operation.

Fig. 7, the tool 1 is provided with a deflector formed by a roller 10 which is mounted loosely on a spindle 11, fixed relatively to the blade 1 and situated at the rear of this latter; this deflector removes the cut part b of the product to be cut from the remaining mass a of the latter.

Fig. 8, the tool is provided with a deflector which is formed by a scraper 12 for removing the fragments of matter adhering to the cut part; this scraper may be mounted on a pivot 13, which is fixed relatively to the blade 1.

Fig. 9 and the following, 1 is the cutting blade constructed in this case in the shape of a circular disc, which is provided with a reinforced central part 20 mounted on a rotating driving spindle 21, the union between this blade and this spindle 21 being, in this case, effected by means of a screw 22.

The deflector combined with this rotary blade is, in this case, formed by a member 23, which is movable in a sleeve 24, arranged obliquely relatively to the plane of the cutting tool 1. This member 23 is, for this purpose, provided with a rod 25 ending in a screw-head 26, which rests on an abutment 27; a spring 28, inserted on the rod 25 of the deflector 23, tends constantly to push this deflector 23 towards the cutting edge 1.

The whole being arranged in this way, when a piece of material to be cut, for example, a ham a with bone b has to be cut up into slices, a knife or any other cutting instrument is, prior to this cutting, inserted between the mass of flesh a and the bone b all around this latter, in such a manner as to detach the flesh from the bone, along a line c. The cutting is then effected when the tool penetrates into the piece a, the cut part d is automatically removed by the deflector 23 and directed by this latter towards a receiving plate or any other support; moreover, when the deflector 23 abuts against the bone b of the mass of meat a, it is pushed back by this latter into its sleeve 24 until (Fig. 10), owing to the oblique position of the sleeve 24, its end becomes tangential to the front face e of the bone b, and it can glide along this latter (Fig. 11). At the same time, from the commencement of the cutting, the slice d separated from the piece a is removed by the blade. When it has been completely cut, the disc of bone f falls down (Fig. 12).

What I claim is:—

1. A tool for cutting into slices a product having soft and hard parts comprising a blade having a cutting edge adjacent to a smooth face and another face having a marginal toothed portion for sawing the hard parts of said product, and the edge of the said marginal toothed portion opposite to the said cutting edge being adjacent to a part which makes with the virtual prolongation of the said toothed face an angle greater than the angle of the said toothed portion with the smooth face, the said part being thus adapted for clearing away the fragments of hard matter resulting from the sawing of said toothed portion.

2. A tool for cutting into slices a product having soft and hard parts comprising a blade having a cutting edge adjacent to a smooth face, and another face having a marginal toothed portion for sawing the hard parts of said product, the edge of the said marginal toothed portion opposite to the said cutting edge being adjacent to a part which makes with the virtual prolongation of the said toothed face an angle greater than the angle of the said toothed portion with the smooth face, the said part being thus adapted for clearing away the fragments of hard matter resulting from the sawing of said toothed portion, and a setting arranged in front of the blade, obliquely to the same and behind the marginal toothed portion in the direction of the progression of the slicing and a deflector carried in said setting and obliquely movable in the said setting relative to the blade, resilient means arranged between said setting and the said deflector for allowing said deflector to abut against any hard part of the product when the said part is cut by the above toothed portion, to be pushed back by this latter into its setting and then to glide over the free side of the said hard part and to be pushed forward by the said resilient means for, then, gliding on the free side of the said hard part.

LUCIEN GANDRIAUT.